Jan. 27, 1959          G. V. LIKENS          2,871,010
MEASUREMENT CONTROLS OR TIMERS FOR FOLDING MACHINES
Filed Dec. 6, 1954          3 Sheets-Sheet 1

INVENTOR.
GLEN V. LIKENS
BY
Hyde, Meyer, Baldwin & Doran
ATTORNEYS

Jan. 27, 1959 G. V. LIKENS 2,871,010
MEASUREMENT CONTROLS OR TIMERS FOR FOLDING MACHINES
Filed Dec. 6, 1954 3 Sheets-Sheet 2

INVENTOR.
GLEN V. LIKENS
BY
ATTORNEYS

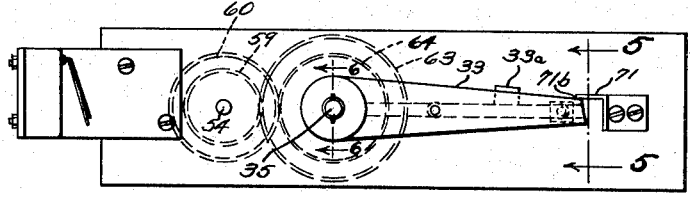
Fig. 4
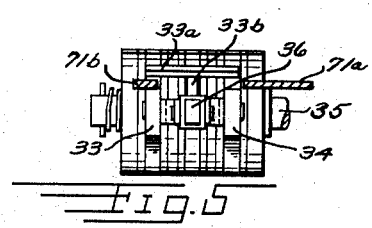
Fig. 5
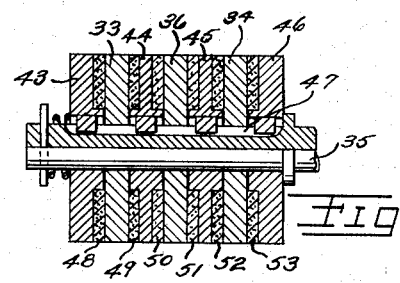
Fig. 6
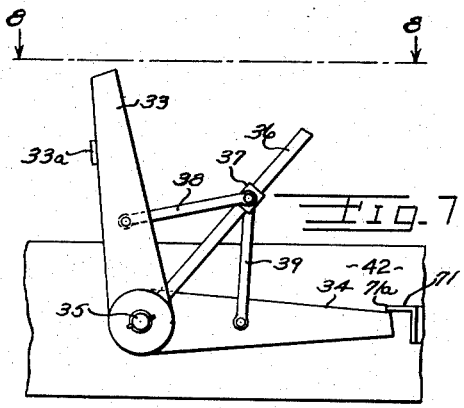
Fig. 7
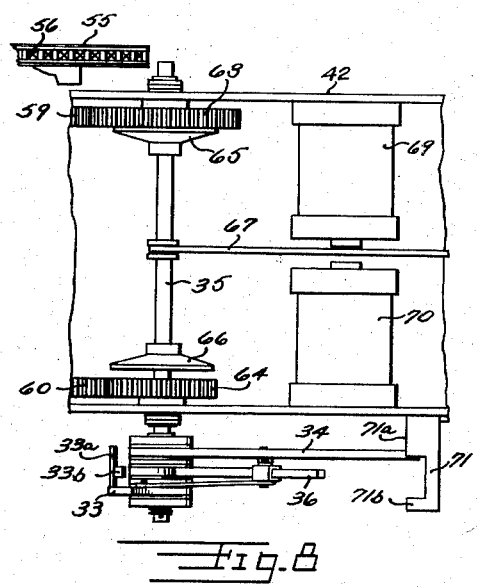
Fig. 8
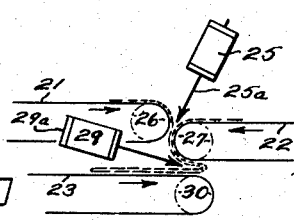
Fig. 9
Fig. 10
INVENTOR.
GLEN V. LIKENS
BY
Hyde, Meyer, Baldwin & Doran
ATTORNEYS

United States Patent Office 2,871,010
Patented Jan. 27, 1959

2,871,010

MEASUREMENT CONTROLS OR TIMERS FOR FOLDING MACHINES

Glen V. Likens, Portland, Oreg.

Application December 6, 1954, Serial No. 473,084

14 Claims. (Cl. 270—81)

The invention relates to novel and improved means for determining, or performing operations with respect to, proportionate points on an article, or on a plurality of articles, moving in succession along a path.

As an example of one useful adaptation of the invention, it may be utilized to control proportionate folds on laundry flatwork articles traveling past folding means adjacent to a conveyor. As will appear, such proportionate folds are achieved regardless of variation of the length of each article, within practical limits.

While this object has been achieved in the prior art, by mechanisms mainly electrical or mainly mechanical as the case may be, my present device is believed by me to be a definite improvement by reason of its structural simplicity and effective performance.

An object of the invention, therefore, is to provide novel and improved means for controlling the performance of an operation at proportional points on each of a series of articles moving in sequence along a path.

Other objects and advantages will be apparent from a study of the following description, in conjunction with the accompanying drawings of one embodiment of the invention. The embodiment selected for description and illustration involves the folding of each of a series of laundry flatwork articles traveling on a conveyor towards folding means. Other embodiments and adaptations will occur to those skilled in the art.

In the drawings:

Fig. 4 is a detail view of some of the controller elements.

Fig. 5 is a view taken approximately on the line 5—5 of Figs. 2 or 4.

Fig. 6 is a view, somewhat enlarged, taken on the line 6—6 of Fig. 4.

Fig. 7 is a side elevational view of the controller arms in an intermediate operating position.

Fig. 8 is a top plan view of the operating arms and drive means therefore, taken approximately on the line 8—8 of Fig. 7.

Figs. 9 and 10 are schematic views indicating operating positions of several operating elements for successive folds.

Figure 1:
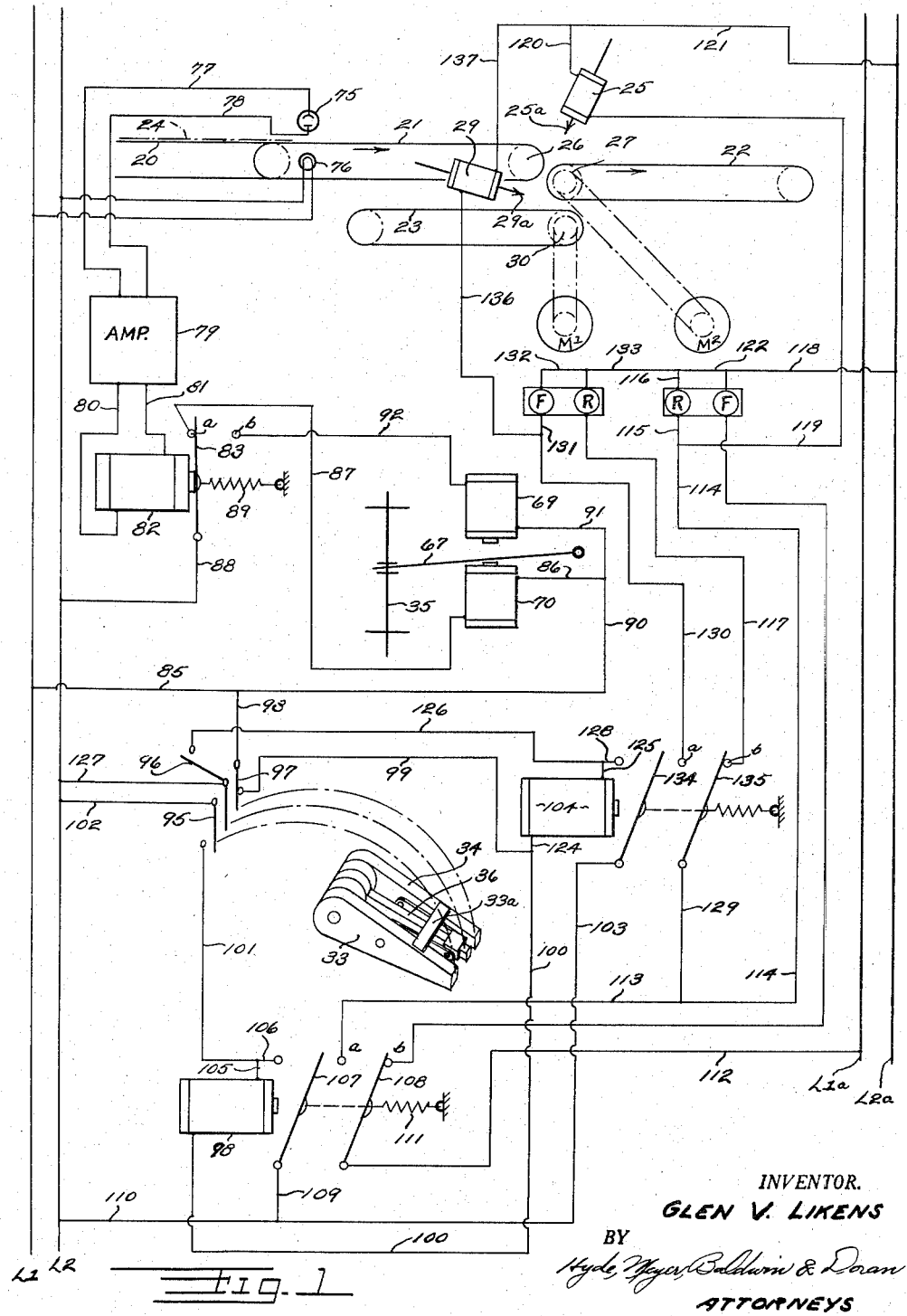
Fig. 1 is a schematic showing of the various operating elements, with appropriate electrical circuits therefor.
Figures 2, 3:
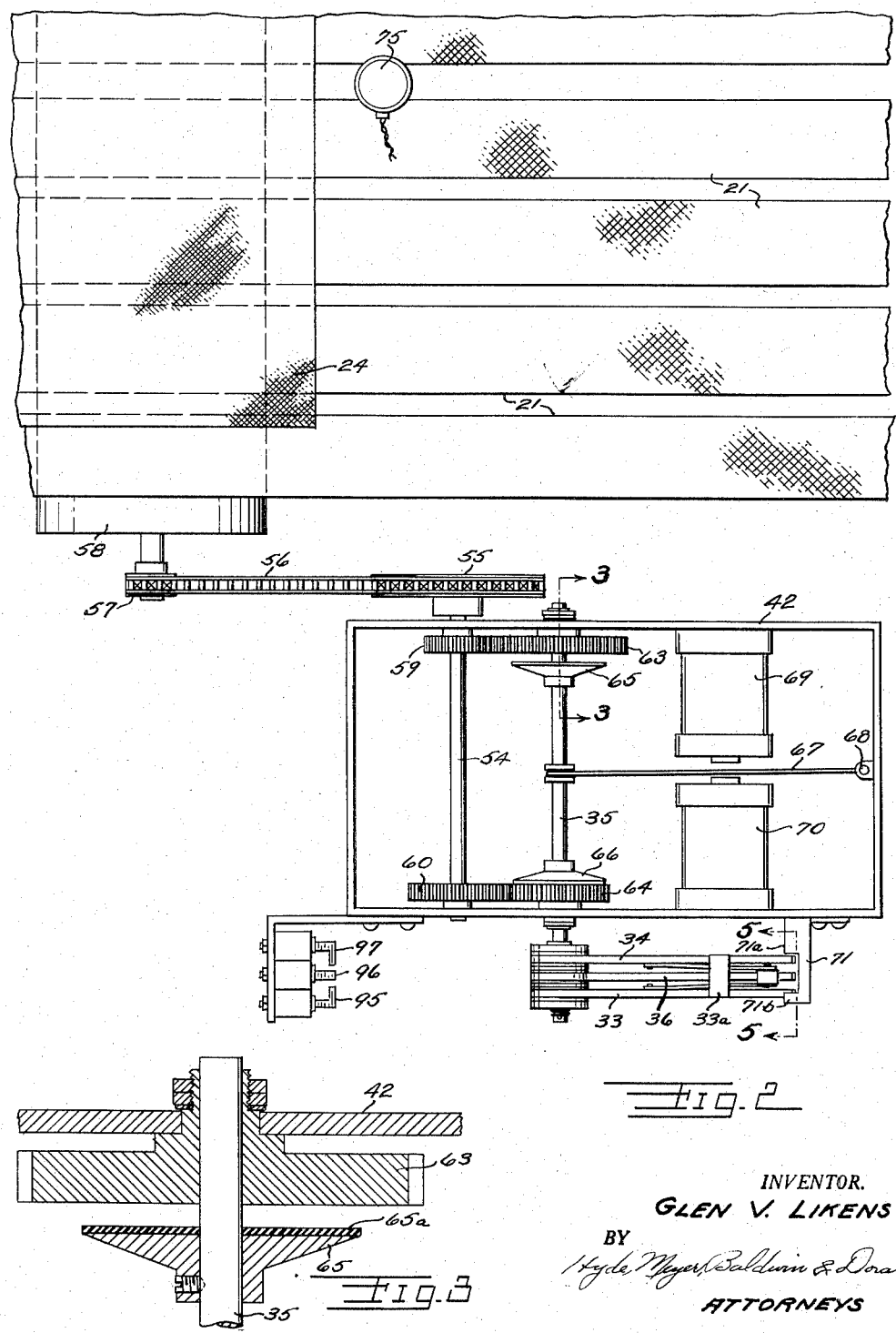
Fig. 2 is a top plan view of my controller, with a fragmentary showing of a work-carrying conveyor, and drive connections for the controller.
Fig. 3 is a sectional view, somewhat enlarged, taken on the line 3—3 of Fig. 2.

Referring now to Figs. 1 and 2, and speaking first generally, I show four sets of conveyors, respectively identified by reference characters 20, 21, 22, and 23, in the order of progress of a traveling article 24. When the leading edge of the article has passed the gap between conveyors 21 and 22, at a predetermined moment as controlled by means later to be described, a reciprocatable blade, plunger, or any suitable folding member 25a is advanced under the control of solenoid 25 so as to fold the article downwardly between rollers 26 and 27. Conveyor 22, which up to this moment was travelling in the direction of the arrow (Fig. 1), now reverses as shown by the arrow (Fig. 9). This moves the article on to conveyor 23 which at the moment is travelling in the direction of the arrow (Fig. 9). At a suitable further moment, a plunger 29a responsive to solenoid 29 performs a second folding operation by inserting the doubled article between rolls 27 and 30 while simultaneously conveyor 23 reverses from the direction indicated by the arrow in Fig. 9 to that of the arrow in Fig. 10. The twice folded article is then carried by any suitable means to a stacker or other means of collection or disposal.

Obviously the accuracy of the folds is dependent on the energization of solenoids 25 and 29 at the proper moment, namely when the appropriate fold point arrives beneath the proper plunger. The means by which timed operation of the successive folding blades takes place, despite the fact that articles in the series may vary in length, will now be described. Determining the proper fold line or lines on each flatwork article may hereinafter sometimes be termed "measuring" the article, since the means herein disclosed may be used for controlling the performance of other operations on other types of articles depending on article length.

The basic measuring element in my control means includes a pair of arms 33 and 34 (Fig. 7), hinged at one end on pivot pin 35 so as to be rotatable, one with respect to the other to vary the angle between them. Swingably mounted on the same shaft 35 is a third arm 36 which is adapted to constantly bisect the angle between arms 33 and 34 in the following way. Arm 36 has a freely slidable collar 37 thereon which is connected by two links 38 and 39, of equal length, respectively to arms 33 and 34 at points equidistant from the axis of shaft 35. All link connections are free, so that, for example, the arm 33 may be swung counterclockwise or clockwise and the arm 36 will swing in the same direction, always bisecting the angle between 33 and 34.

The arms are driven from shaft 35 by friction clutch means including driving disks 43, 44, 45 and 46 all of which are keyed in a slot 47 in shaft 35 as best seen in Fig. 6. Intermediate the arm hubs and the driving disks are frictional facing disks 48, 49, 50, 51, 52 and 53, the frictional characteristics of which may be varied to suit the specific requirements. It is desirable, as will later more fully appear, that the frictional contact between the central arm 36 and its driving disks 44 and 45 should be less than between the arms 33 and 34 and their respective driving disks. If this were not so, and if the shaft 35 (Fig. 7) were rotating counterclockwise, arm 33 would likewise rotate counterclockwise at shaft speed. There would be however a tendency, induced through friction disks 50 and 51, to drive arm 36 also at shaft speed, whereby to cause it to fight the linkage connection and in all likelihood tend to push arm 33 counterclockwise at greater than shaft speed. I have, therefore, reduced the frictional adhesion between arm 36, friction disks 50 and 51, and driving disks 44 and 45 so that the linkage may freely control the position of central arm 36.

From what has been said so far, and from a consideration of Fig. 7, it is apparent that arm 36 will travel at one-half the speed of either of the arms 33 or 34 if the other arm remains stationary, and, in a pertinent example, when arm 33 is rotating at the speed of shaft 35, then arm 36 is rotating at one-half shaft speed.

The positions and movements of arms 33, 34, and 36 are of significance because they operate certain control switches at critical times in the folding control cycle.

Referring now to Fig. 2, it will be seen that shaft 35, which drives the timing arms just described, is journalled at spaced points in the frame 42 of a timer gear housing. The frame 42 also has journalled therein a driving shaft 54 which has attached thereto, on the housing exterior, a driving gear 55 driven by a link chain 56 from a pinion 57 on the end of the shaft for roller 58 associated with the conveyor ribbons 21. This insures that driving shaft 54 will turn at a speed in constant relationship to that of the conveyor. Shaft 54 has gears 59 and 60 pinned at its opposed ends.

Journalled to rotate freely around the ends of shaft 35 within frame 42 are two gears 63 and 64. Gear 63 is in mesh with gear 59, and is twice the diameter of gear 59. Gear 64 is in mesh with gear 60 and is of the same diameter. Therefore, if the drive from shaft 54 to shaft 35 is through gears 60 and 64, then the two shafts will rotate at the same rate, but if the drive is through gears 59 and 63, then shaft 35 will travel at one-half the rate of shaft 54.

Determination of the driving connection is achieved by endwise shift of shaft 35, thereby producing endwise movement of a pair of clutch disks 65 and 66 to establish a driven connection of shaft 35 with either gear 63 or gear 64. Referring for example to Figs. 2 and 3, if shaft 35 be moved upwardly it will bring the facing 65a of the clutch disk 65 into frictional contact with gear 63 so that the shaft will rotate with gear 63, whereas if shaft 35 is in its position as shown in Fig. 2, the shaft is rotating with gear 64.

Shifting of the shaft is accomplished by means of an armature 67 which is pivoted at 68 on the frame and which has a loose connection with shaft 35 at its free end. The armature responds to energization of either the electromagnet 69 or 70.

It will by this time be apparent that energization of either coil 69 or coil 70 determines the ratio of rotation of shaft 35 with respect to the conveyor ribbons, and consequently the rates of rotation of the timing arms 33, 34 and 36, unless said arms or either of them are restrained in any way, for example the restraint imposed on arm 34 in Figs. 7 by the stop 71. Stop 71 actually has stop portions 71a and 71b which, as will appear, become effective respectively on arms 33 or 34 at one or other points in the cycle.

The diagram, Fig. 1, shows the situation of all electric elements at the beginning of a timing cycle, namely relay coil 82 is energized by the photo-electric couple 75, 76 through conductors 77 and 78 which feed amplifier 79, and then through conductors 80 and 81 to relay coil 82. In this idle condition the armature or switch blade 83 is in its "a" position, as shown, thereby establishing a circuit to magnet coil 70 as follows; from line $L_1$ through conductors 85, 90, and 86, coil 70, conductor 87, switch armature 83 in "a" position, and conductor 88 to $L_2$. As will be recalled from a preceding portion of this specification, and referring to Fig. 2, when coil 70 is energized, timer shaft 35 is travelling at proportional speed to that of the conveyor. While in this idle position, however, the timing arms 33, 34 and 36 are being restrained from rotation because arm 33 is held by stop 71b (Fig. 2) and the other two arms are held beneath a stop finger 33a fixed to arm 33 and extending across the other two arms. Although timer driven shaft 35 is rotating, therefore, the frictional mounting of the timer arms permits them to be held as indicated. The conveyor 20 is running in forward direction.

A travelling flatwork article 24 now arrives on the conveyor to initiate the series of events now to be described.

The leading edge of article 24 intercepts the light beam from light 76 to cell 75. This breaks the energizing circuits to amplifier 79 and relay 82, as previously described, and relay 82 is de-energized, whereupon spring 89 moves switch blade 83 to its "b" position, thereby energizing magnet coil 69, as follows: from $L_1$ through conductors 85, 90, and 91, coil 69, conductor 92, switch blade 83 in "b" position, and conductor 88 to $L_2$.

Energization of coil 69 moves armature 67 towards coil 69, thereby shifting drive shaft 35 to cause engagement between clutch member 65 and gear 63, whereupon, as previously described shaft 35 begins to travel at one-half the speed of shaft 54. Simultaneously, shifting of the shaft carries timing arm 33 laterally from beneath stop 71b, and arm 33 begins to rotate counterclockwise (Figs. 1 and 7), also of course at one half the speed of shaft 54 and of conveyor 20 while the article travels at full speed along conveyor 20. Arm 34 was placed under stop 71a (Fig. 8) by endwise shift of shaft 35, so that it remains in the position shown in Fig. 7, while arm 36 moves to maintain a position in which it bisects the angle between arms 33 and 34, as previously described. This situation continues until the trailing edge of the article passes the point of registry with photocell 75.

As soon as the light beam from lamp 76 again strikes cell 75, the amplifier 79 and relay 82 are again energized, switch blade 89 moves to its "a" position so as to open the circuit for coil 69 and complete the circuit to coil 70, thereby shifting armature lever 67 and shaft 35 to the position shown in Fig. 2, namely the position in which shaft 35 and arm 33 are moving at full proportional conveyor speed. This shift also frees timer arm 34 from stop 71a so that it likewise turns with shaft 35, and from then on for a period there is no change in angular position between the three arms 33, 34, and 36. The article has been "measured" in the sense heretofore described, and during the measuring period the arm 33 has traveled at one-half conveyor speed. The "period" mentioned in the second preceding sentence depends on two coinciding factors, namely the time required for the mid-point of the article to reach the first fold point, and the time required for the arm 33 to intercept a switch 95 which is one of three adjacently disposed switches 95, 96 and 97.

Interception of switch 95 closes the switch with the following effects, all as defined by appropriate numbered prescripts "1," "2" etc., in the following paragraphs, it being noted that a leading portion of the travelling article now has progressed somewhat along conveyor 22 in the direction indicated by the arrow in Fig. 1.

(1) The first effect is to energize a relay 98 as follows: from $L_1$ through conductors 85 and 93, switch 97 at present closed, conductors 99 and 100, coil 98, conductors 105 and 101, switch 95 now closed, and conductor 102 to $L_2$.

(2) A maintaining circuit is immediately set up for coil 98 from $L_1$ through conductors 85 and 93, switch 97 at present closed, conductors 99 and 100, coil 98, conductors 105 and 106, switch blade 107 now closed by energization of coil 98, and conductors 109 and 110 to $L_2$. While switch blade 107 remains closed under the influence of maintained relay 98, switch blade 108 which is ganged with blade 107 also is closed, both of them against the bias of spring 111.

(3) Conveyor 22 upon which the leading edge of the article is progressing is reversed by means of the following circuit, it being understood that $L_1(a)$ and $L_2(a)$ are the full equivalent of $L_1$ and $L_2$ but placed on the right side of Fig. 1 for simplicity: From $L_1(a)$ through conductor 112, switch blade 108 now in "a" position, conductors 113, 114 and 115, reverse wiring "R" of motor $M_2$, and conductors 116, 122, and 118 to $L_2(a)$. Reversal of motor $M_2$ causes conveyor 22 to rotate in the direction of the arrow, Fig. 9.

(4) Simultaneously coil 25 is energized to cause its plunger 25a to execute a fold operation on the article as follows: from $L_1(a)$ through conductor 112, switch blade 108 in (a) position, conductors 113, 114, and 119, coil 25 and conductors 120 and 121 to $L_2(a)$. The once-folded article descends on conveyor 23 which at the moment is travelling in the direction of the arrow, Fig. 9.

The first fold having now been executed, the various mechanical and electrical elements are directed towards the making of the second fold, the intermediate arm being the initiating factor, as follows, it being kept in mind that the angular distance between arms 33 and 34, as determined during the half-speed motion of arm 33, measured half of the article 24 and caused the half-point fold, and also that the angular distance between arm 33 and arm 36 is determined during the quarter speed operation of arm 36, and consequently arm 36 will initiate the second or quarter point fold.

When arm 36 intercepts the depending portion of switch 96 it closes switch 96 with the following results, in appropriately numbered paragraphs:

(5) Relay coil 104 will be energized through the following circuit: from $L_1$ through conductors 85 and 93, switch 97 at present closed, conductors 99 and 124, coil 104, conductors 125 and 126, switch 96 now closed, and conductor 127 to $L_2$.

(6) Energization of coil 104 sets up a maintaining circuit for the coil through closed switch blade 134, as follows: from $L_1$ through conductors 85 and 93, switch 97 at present closed, conductors 99 and 124, coil 104, conductors 125 and 128, switch blade 134 closed, and conductors 103 and 110 to $L_2$.

(7) Maintained energization of coil 104 causes forward movement of motor $M_1$ as follows: from $L_1(a)$ through conductors 112, switch blade 108 still in (a) position, conductors 113 and 129, switch blade 135 now in "a" position, conductors 130 and 131, forward winding of motor $M_1$ and conductors 132, 133, 122 and 118 to $L_2(a)$. The motor runs appropriately to cause the conveyor 23 to run in the direction of the arrow in Fig. 10.

(8) At the same time plunger 29a is moved to produce the second fold, as indicated in Fig. 10, by energization of coil 29, as follows: from $L_1(a)$ through conductor 112, switch blade 108 still maintained in "a" position, conductors 113 and 129, switch blade 135 maintained in "a" position, conductors 130 and 136, coil 29, and conductors 137 and 121 to $L_2(a)$. Upon execution of this second fold the article passes from conveyor 23 to suitable stacking means, or is otherwise dealt with as desired.

Conditions must now be established to restore the control members, travelling conveyor, etc., to the cycle-starting status so as to be ready for the next following article. This is done as follows, referring especially to Fig. 1. Arm 34, which is the rearmost arm in the order of rotation, contacts the depending end of switch 97 and opens the switch. Referring back momentarily to the maintaining circuits described in numbered paragraphs (2) and (6) it will be seen that these maintaining circuits are dependent on a closed position for switch 97 and accordingly when switch 97 is opened, the maintained relays 98 and 104 are de-energized and the respective ganged switches operated thereby are returned by their respective springs to the original idle position shown in Fig. 1. Conveyor belt 22 runs forward in the direction of the arrow (Fig. 1). Conveyor belt 23 and its driving motor $M_1$ stop running. Relay 82 is energized by the photoelectric circuits, and keeps switch 83 closed so as to keep magnet coil 70 energized, and consequently shaft 35 will remain in the full speed position, until the next article interrupts the photoelectric beam.

While the shaft 35 rotates at full speed it carries the arms 33, 34 and 36 around until they are stopped by means heretofore described, namely, under these conditions, the leading arm 33 first contacts the under side of stop 71b, and the arms 36 and 34 rotate to contact with the finger 33a fixed to arm 33. As previously described, shifting of shaft 35 by arrival of the next article at the photoelectric trip moves arm 33 from beneath stop 71b, but simultaneously places arm 34 beneath stop 71a as shown in Figs. 7 and 8.

As shown (although not necessarily) arm 36 is smaller than either arm 33 or 34 because arm 36 must accommodate the sliding collar 37. As a matter of convenient alignment at a stop such as cross bar or finger 33a, I have provided a short extension 33b below the finger to be contacted by arm 36 at the proper plane of alignment. This extension is best shown in Fig. 5. It prevents the intermediate arm 36 from travelling past the aligned position of the other two at a stop, and perhaps jamming and locking the assembly.

It will be apparent to those skilled in the art that a succeeding article might be travelling too close to a preceding article that the succeeding article would intercept the photoelectric beam before the timing arms had returned to cycle-starting position. This would, of course, shift the driven shaft 35 and institute rotation at one-half speed while the arms were not in proper starting position so that the timing of the succeeding article would throw the whole cycle into confusion. To avoid this, anyone skilled in the art may provide a plurality of timing control units which are sequentially placed in operation by successive articles so that each one of a plurality of articles in sequence is measured by a respective unit. Devices of this nature are already familiar to those skilled in the art of proportional operation control such as in the laundry flatwork folding field.

What is claimed is:

1. In a folding machine of the type wherein folding means performs two folding operations, both proportionate, but in different ratios, to article length upon each of a series of articles fed in succession along a path, improved controlling means for said folding means comprising a first timing arm, a second timing arm, and a third arm, driving means sensitive to passage of the leading edge of the article past a control point for rotating said first timing arm for a first increment of the timing cycle at a speed bearing a fractional relationship to article travel, and likewise sensitive to passage of the trailing edge of the article past said control point for rotating said first timing arm a second increment of the timing cycle at a speed proportionate to the speed of article travel, means for preventing rotation of said third arm during said first increment, means providing a common axis of rotation for all said arms, said second timing arm having a linkage connection with both said first timing arm and said third stopped arm whereby to cause said second timing arm to rotate at one-half the speed of said first timing arm, means for releasing said third arm at the termination of said first increment, means for causing said third arm, immediately thereafter and during said second increment, to be driven with said first and second arms at said speed proportional to article travel, and respective first and second fold initiating means in the paths of travel of said first timing arm and said second timing arm, and effective on said folding means, for initiating first and second folding operations when said timing arms move to respective contacting registry with said fold-initiating means.

2. Controlling means as defined in claim 1 wherein said driving means includes a driven shaft, said first and second timing arms having frictional driven connections with said driven shaft whereby to respond to rotation of the driven shaft when the arms are unimpeded, and stop means for preventing rotation of the first and second timing arms with said driven shaft prior to initiation of the timing cycle.

3. Controlling means as defined in claim 2 wherein the frictional driven connection for said first timing arm has a higher coefficient of friction than the frictional driven connection for said second timing arm whereby said first timing arm, when unimpeded, is more readily responsive to the rotation of said driven shaft.

4. Controlling means as defined in claim 1 wherein said linkage connection of the second timing arm with the first timing arm and the third arm comprises a slidable block on said second timing arm, a first link pivotally connected to said block and to said first timing arm, a second link pivotally connected to said block and to said third arm.

5. Controlling means as defined in claim 4 wherein said links are of equal length, and are connected to their respective first and third arms at points equidistant from the common axis of arm rotation.

6. In a folding machine of the type wherein folding means performs two folding operations, both proportionate, but in different ratios, to article length upon each of a series of articles fed in succession along a path, improved controlling means for said folding means comprising a first timing member, a second timing member, and a third cooperating member, driving means sensitive to passage of the leading edge of the article past a control point for moving said first timing member during a first increment of a timing cycle along a path at a speed bearing a fractional relationship to article travel, and likewise sensitive to passage of the trailing edge of the article past said control point for moving said first timing member during a second increment of a timing cycle along said path at a speed proportionate to the speed of article travel, means for maintaining said third member in fixed position during said first increment, said second timing member having a first linkage connection with said first timing member and a second linkage connection with said fixed member whereby to cause said second timing member, by its movement, to maintain a position between said first timing member and said fixed member, means for releasing said third arm at the termination of said first increment, means for causing said third arm, immediately thereafter and during said second increment, to be driven with said first and second arms at said speed proportional to article travel, and respective first and second fold initiating means in the paths of travel of said first timing member and said second timing member, and effective on said folding means, for initiating first and second folding operations when said timing members move to respective contacting registry with said fold-initiating means.

7. In a folding machine adapted to impart a plurality of folds to a foldable article and having folding means, and a conveyor for carrying said article past said folding means, timing means effective on said folding means for controlling the folding of the article proportionally to article length comprising a rotatable timing shaft, means for rotating said shaft for a first time increment of the timing period, responsive to article travel, at a speed bearing a fractional relationship to conveyor speed, and for a second increment of the timing period, also responsive to article travel, at a speed proportional to conveyor speed, and means responsive to rotation of said timing shaft for initiating operation of said folding means comprising first, second and third timing arms rotatable around the timing shaft axis, friction clutch means establishing continuous driving connection between each said timing arm, when unhindered, and the timing shaft, said second timing arm having linkage connections both to said first arm and said third arm, whereby, when said first timing arm is travelling at said fractional speed, and said third timing arm is restrained, said second timing arm is travelling at one half timing shaft speed, means for releasing said third arm at the termination of said first increment, thereby causing said third arm, immediately thereafter, and during said second increment, to be driven with said first and second arms by said friction clutch means at said speed proportionate to article travel, and respective means sensitive to successive positions of said first timing arm and said second timing arm, and effective upon said folding means, for operating said folding means.

8. In a folding machine of the type wherein folding means performs two folding operations, both proportionate, but in different ratios, to article length upon each of a series of articles fed in succession along a path, improved controlling means for said folding means comprising a rotatable timing shaft, driving means for rotating said timing shaft for a first increment of the timing cycle at a speed bearing a fractional relationship to article travel, and for a second increment of the timing cycle at a speed proportionate to the speed of article travel, means sensitive to passage of the leading edge of the article therepast and effective on said driving means for initiating shaft rotation at said first increment, and means sensitive to passage of the trailing edge of the article therepast and effective on said driving means for initiating shaft rotation at said second increment, and means responsive to rotation of said timing shaft for causing operation of said folding means comprising a first timing arm, a second timing arm, and a third arm, all three arms rotatable around said timing shaft, said first timing arm travelling with said timing shaft during said first and second increments, means preventing rotation of said third arm during said first increment, said second timing arm having a linkage connection both with said first timing arm and said third stopped arm whereby to cause said second timing arm to rotate at one half the speed of said first timing arm means for releasing said third arm at the termination of said first increment, means for causing said third arm, immediately thereafter and during said second increment, to be driven with said first and second arms at said speed proportional to article travel, and respective fold-initiating means in the paths of travel of said first timing arm and said second timing arm, and effective on said folding means, for initiating first and second folding operations when said timing arms move to contacting registry with said fold-initiating means.

9. In a folding machine of the type wherein folding means performs an operation proportionate to article length upon each of a series of articles fed in succession along a path, and having a control point on said path, improved controlling means for said folding means comprising a first movable member, means sensitive to passage of the leading edge of the article past said control point for moving said first member at a speed bearing a fractional relationship to the speed of article travel, a second movable member, means for holding said second movable member immovable while said article is passing said control point whereby to produce relative separation movement between said first member and said second member and for releasing said second member to move at the same speed as said first member at a speed proportionate to article travel when the trailing edge of said article passes said control point, and a movable timing member having a linkage connection with said first member and with said second member whereby to cause said timing member to move at half the speed of said first member during said relative separation movement between said first member and said second member, and fold-initiating means in the path of travel of said timing member, and effective on said folding means, for causing a folding operation when said timing member moves to contacting registry with said fold-initiating means.

10. In a folding machine of the type wherein folding means performs an operation proportionate to article length upon each of a series of articles fed in succession along a path, improved controlling means for said folding means comprising a first arm, a second timing arm, and a third arm, a control point in said path, driving means sensitive to passage of the leading edge of the article past said control point for rotating said first arm, for a first increment of the timing cycle, at a speed bearing a fractional relationship to article travel, and likewise sensitive to passage of the trailing edge of the article past said control point for rotating said first arm a second increment of the timing cycle at a speed proportionate to the speed of article travel, means for preventing rotation of said third arm during said first increment, means providing a common axis of rotation for all said arms, said second timing arm having a linkage connection with both said first and third arms, whereby to cause said second timing arm to rotate at one half the speed of said first arm while said third arm is held as aforesaid, means for releasing said third arm at the termination of said first increment, means for causing said third arm, immediately thereafter and during said second increment, to be driven with said first and second arms at said speed proportional to article travel, and fold-initiating means in the path of travel of said second timing arm, and effective on said folding means, for initiating a folding operation when said second timing arm moves to contacting registry with said fold-initiating means.

11. In a folding machine of the type wherein folding means performs an operation proportionate to article length upon each of a series of articles fed in succession along a path, and having a control point on said path, improved controlling means for said folding means comprising a rotatable timing shaft, driving means for rotating said shaft for a first increment of the timing cycle at a speed bearing a fractional relationship to article travel, and for a second increment of the timing cycle at a speed proportionate to the speed of article travel, means sensitive to passage of the leading edge of the article past said control point, and effective on said driving means, for instituting shaft rotation at said first increment, and means sensitive to passage of the trailing edge of the article therepast, and effective on said driving means, for initiating shaft rotation at said second increment, and means responsive to rotation of said timing shaft for causing operation of said folding means including a first arm, a second timing arm, and a third arm, all three arms rotatable around said timing shaft, said first arm rotating with said shaft during said first and second increments, means preventing rotation of said third arm during said first increment, said second timing arm having a linkage connection with said first and third arms whereby to cause said second timing arm to rotate at one half the speed of said first arm, means for releasing said third arm at the termination of said first increment, means for causing said third arm, immediately thereafter and during said second increment, to be driven with said first and second arms at said speed proportional to article travel, and fold-initiating means in the path of travel of said second timing arm, and effective on said folding means, for initiating a folding operation when said second timing arm moves to contacting registry with said fold-initiating means.

12. In a folding machine of the type wherein folding means performs an operation proportionate to article length upon each of a series of articles fed in succession along a path, and having a control point on said path, improved controlling means for said folding means comprising a first movable member, means sensitive to passage of the leading edge of the article past said control point for moving said first member at a selected speed, a second movable member, means for holding said second movable member immovable while said article is passing said control point whereby to produce relative separation movement between said first member and said second member, and for releasing said second member to move at the same speed as said first member when the trailing edge of said article passes said control point, a movable timing member having a linkage connection with said first member and with said second member whereby to cause said timing member to move at half the speed of said first member during said relative separation movement between said first member and said second member, and fold-initiating means in the path of travel of said timing member, and effective on said folding means, for causing a folding operation when said timing member moves to contacting registry with said fold-initiating means.

13. In a folding machine of the type wherein folding means performs an operation, proportionate to article length upon each of a series of articles fed in succession along a path, improved controlling means for said folding means comprising a first arm, a second timing arm, and a third arm, a control point in said path, driving means sensitive to passage of the leading edge of the article past said control point for rotating said first arm, for a first increment of the timing cycle, at a selected speed, and likewise sensitive to passage of the trailing edge of the article past said control point for rotating said first arm a second increment of the timing cycle at a speed proportionate to the speed of article travel, means for preventing rotation of said third arm during said first increment, and for releasing said third arm to move with said first arm when the trailing edge of said article passes said control point, means providing a common axis of rotation for all said arms, said timing arm having a linkage connection with said first arm and said third arm whereby to cause said second timing arm to rotate at one-half the speed of said first arm while said third arm is held as aforesaid, and fold-initiating means in the path of travel of said second timing arm, and effective on said folding means, for initiating a folding operation when said second timing arm moves to contacting registry with said fold-initiating means.

14. In a folding machine of the type wherein folding means performs an operation proportionate to article length upon each of a series of articles fed in succession along a path, and having a control point on said path, improved controlling means for said folding means comprising a rotatable timing shaft, driving means for rotating said shaft for a first increment of the timing cycle at a selected speed, and for a second increment of the timing cycle at a speed proportionate to the speed of article travel, means sensitive to passage of the leading edge of the article past said control point, and effective on said driving means, for instituting shaft rotation at said first increment, and sensitive to passage of the trailing edge of the article therepast, and effective on said driving means, for initiating shaft rotation at said second increment, and means responsive to rotation of said timing shaft for causing operation of said folding means including a first arm, a second timing arm, and a third arm, all three arms rotatable around said timing shaft, said first arm rotating with said shaft during said first and second increments, means preventing rotation of said third arm during said first increment, said second timing arm having a linkage connection with said first and third arms whereby to cause said second timing arm to rotate at one-half the speed of said first arm while said third arm is immovable, means for releasing said third arm at the termination of said first increment, means for causing said third arm, immediately thereafter and during said second increment, to be driven with said first and second arms at said speed proportional to article travel, and fold-initiating means in the path of travel of said second timing arm, and effective on said folding means, for initiating a folding operation when said second timing arm moves to contacting registry with said fold-initiating means.

References Cited in the file of this patent
UNITED STATES PATENTS 1,960,940   Kohn _____ May 29, 1934